April 28, 1959
D. T. HURD ET AL
2,884,161
COMPOSITE ARTICLES OF METAL AND ELASTOMER
AND METHOD OF FABRICATION
Filed Sept. 25, 1952
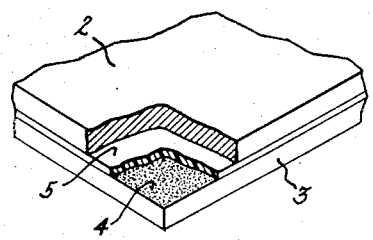
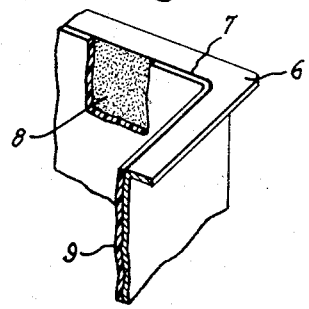
Inventors:
Robert W. Finholt,
Dallas T. Hurd,
by Paul A. Frank
Their Attorney.

United States Patent Office 2,884,161
Patented Apr. 28, 1959

2,884,161

COMPOSITE ARTICLES OF METAL AND ELASTOMER AND METHOD OF FABRICATION

Dallas T. Hurd, Burnt Hills, N.Y., and Robert W. Finholt, Erie, Pa., assignors to General Electric Company, a corporation of New York Application September 25, 1952, Serial No. 311,494

6 Claims. (Cl. 220—63)

The present invention comprises improved composite articles of metal and an elastomer, the latter including for example, natural and artificial rubber; polyorganosiloxane elastomers; polymerized butylene, and similar products. Our invention includes a method applicable to the fabrication of useful composite devices of metal and elastomer, as for example, anti-vibration and anti-shock devices; metal tanks coated internally or externally or on both sides with corrosion resisting coatings of natural or artificial rubber; gasketing or sealing devices to prevent seepage of water or other liquids, or to prevent influx or escape of gases under pressure; hermetic sealing of electrical apparatus such as transformers or capacitors used at high altitudes, in deleterious atmospheres, as, for example, atmospheres containing excessive humidity or salt spray.

Heretofore, when it was desired to unite a sheet, or other body of elastomer, with a metal body, a bonding material or cement was employed which in some cases consisted of an adhesive composition comprising a solvent and an elastomer or consisted of another cementing material compatible with the elastomer to be bonded. However, by such means only imperfect union was obtained and in some cases the solvent, or other cement base had an injurious effect on the metal or the elastomer and even on adjoining materials or parts of an assembly of which members so made constituted a part.

In accordance with our present invention, bodies of metal and bodies of elastomers are bonded to one another at an elevated temperature by an intermediate film of a form of black copper oxide. The oxide film should be produced under oxidizing conditions in a solution as will be explained and in the absence of gaseous oxidation, such for example, as oxidation at an elevated temperature by oxygen of the atmosphere. As will be hereinafter more fully described such bonding film of copper oxide may be produced by either of two methods namely; (1) a method involving oxidation of copper by an active chemical oxidizing reagent in an aqueous alkaline solution and (2) a method involving oxidation by an electrolytic effect at the surface of copper to be oxidized when functioning as anode in an aqueous alkaline electrolyte for the conduction of electric current through the electrolyte to a cooperating cathode. The novel features of our invention are set forth with greater particularity in the appended claims.

In the accompanying drawing, Fig. 1 illustrates a composite article comprising metal plates, shown in part broken away and being joined to an interjacent pad of elastomer; and Fig. 2 is a fragmental view of a portion of a metal tank which is joined to a lining of elastomer in accordance with our invention.

The article illustrated by Fig. 1 and shown in part broken away consists of plates 2, 3 which may consist of copper, or some other metal, for example, iron or steel, provided with an adherent coating of copper, which is oxidized as indicated by the stippled area 4. It is essential only that the surfaces facing the interjacent layer 5 of elastomer should consist of copper or of an alloy having a substantial copper content. To render the drawing as clear as possible a separate copper coating has not been indicated. Our invention may be practiced with metal articles consisting of copper.

The tank 6 shown in Fig. 2 may consist of iron or steel coated internally with a film of copper (as indicated by the heavy line 7) which is oxidized by one of the indicated methods as shown at 8 by breaking away part of the lining 9. The latter consists of natural or artificial rubber which is applied to the inner surface of the tank in accordance with our invention.

The surfaces to be joined to an elastomer are solution-oxidized by either of the methods above indicated. For example, the contacting surfaces after being thoroughly cleaned may be oxidized in an alkaline solution containing an active oxidizing reagent, as for example, sodium or potassium chlorite. Oxidizing agents of this kind are described in U.S. Patent 2,364,993 issued to Walter R. Meyer on December 12, 1944. Oxidizers suitable for this purpose are sold in the open market, examples being "Ebonol C" sold by Ethone, Inc., of New Haven, Connecticut, and "Black Magic" sold by Mitchell-Bradford Chemical Co. of Stratford, Connecticut. Satisfactory results can be obtained with a solution containing 25 grams of such commercial reagents per 100 cc. of water and with a reaction time of about 30 minutes at a temperature of 100° C.

The film of copper oxide may be produced on the copper surfaces to be oxidized in a shorter time by anodic oxidizing effected in an aqueous alkaline solution. For example, the article to be oxidized after being cleaned may be operated as an anode in an electrolytic cell provided with a suitable cooperating cathode and an electrolyte consisting of a solution in water of a strong alkali, such for example, as sodium or potassium hydroxide, having a concentration in the range of about 15 to 30 percent and preferably being maintained at an elevated temperature, for example, in the range of 90 to 100° C. A satisfactory coating may be formed in from circa 1–3 minutes with an applied potential of 2.0 volts through a proper current-limiting resistor.

After the surface of copper to be joined to the layer of elastomer has been suitably oxidized, washed, and dried, the oxidized surface, or surfaces, can be firmly bonded to the elastimer by bringing the surface into contact with the unvulcanized elastomer composition, that is, the composition comprising the raw elastomer compounded together with the necessary curing additions, such as vulcanizing agents, fillers, accelerators, etc., under pressure and heating to an elevated temperature for sufficient time to vulcanize the elastomer. A firm bond thus may be produced, for example, by heating a properly oxidized copper surface in contact with butyl rubber stock compounded with carbon black filler, suitable sulfur vulcanizing agent, and suitable accelerators to about 150° C. for 20 to 30 minutes under pressure to cure the butyl rubber composition. Heat may be applied in an oven, or in a conventional molding press, or otherwise by the application of a suitable heating agent to the opposite surface of a metal sheet to be united with the elastomer surface. Included among elastomers thus joined to a solution-oxidized copper surface are natural rubber, butyl rubber, neoprene, and silicone rubber. Preferably, the surfaces to be joined are first brought into juxtaposition and held in contact under pressure before heat is applied thereby avoiding partial curing of the elastomer before the elastomer can soften and flow sufficiently to wet the copper oxide surface. It is necessary to obtain a firm bond that the uncured elastomer wet and flow into the copper oxide surface before the curing or vulcanization process is completed. It will be appreciated that a large variety of different compounds of such elastomers, such as with different fillers or different vulcanizing agents, will be applicable to sealing to metal by means of our invention.

When surfaces thus joined are pulled forcibly rupture occurs in the body of the rubber, or other elastomer and not by the elastomer pulling away from the oxidized surface. Apparently the junction of the copper oxide and the elastomer occurs by specific adhesion due to close-range intermolecular forces, that is, by a chemical or quasi-chemical effect between the copper oxide and the elastomer.

What we claim as new and desire to secure by Letters Patent of the United States is:

1. The combination of a metal body having a surface layer at least thereof comprising copper, an adherent film thereon consisting of solution-oxidized black oxide of copper and a body of rubber vulcanized to said metal body by the intermediary of said film of oxide.

2. The combination of a plate-like body of copper, an adherent film on a surface thereof consisting of oxide of copper produced by oxidation in an alkaline aqueous solution and a layer of rubber vulcanized to said body by said film of oxide.

3. The combination of a foundation plate of ferrous metal, a coating of copper united with a surface thereof, a coating of anodically-produced oxide of copper thereon and a plate of rubber vulcanized to said metal foundation plate by said film of copper oxide.

4. The combination of a steel tank, a coating of copper on the surface of said tank, a film of solution-oxidized black copper oxide comprising cuprous and cupric oxide vulcanized to said coating of copper and a film of natural rubber integrally united with said copper oxide.

5. The combination of a plurality of spaced plates consisting of ferrous metal, layers of copper united with oppositely spaced surfaces of said plates, films of copper oxide on said copper layers produced by oxidation of copper in an alkaline solution and a plate-like body of rubber between said plates vulcanized to said oxide films whereby said plates are joined to one another to constitute a unitary structure.

6. The method of fabricating composite articles the members of which consist of a body of rubber and a body of metal, the surface at least of which consists of copper which consists in oxidizing said copper surface in an aqueous alkaline medium, bringing the oxidized surface into contact with a body of unvulcanized rubber containing suitable curing agents and heating under pressure to vulcanize said rubber into adherent relation with the oxidized surface.

References Cited in the file of this patent

UNITED STATES PATENTS

| | | |
|---|---|---|
| 1,842,970 | Hovey | Jan. 26, 1932 |
| 2,104,483 | Hewitt | Jan. 4, 1938 |
| 2,364,993 | Meyer | Dec. 12, 1944 |
| 2,387,335 | Leonard | Oct. 23, 1945 |
| 2,510,857 | Bihlman | June 6, 1950 |
| 2,551,591 | Foord | May 8, 1951 |

OTHER REFERENCES

Lya Puntsova et al.: article published in Chemical Abstracts, volume 33, No. 17, page 6725 on September 10, 1939, 204–56.